United States Patent
Hua et al.

(10) Patent No.: US 12,323,909 B2
(45) Date of Patent: Jun. 3, 2025

(54) SYSTEMS AND METHODS FOR APPLICATION FUNCTION-INITIATED ADMISSION CONTROL FOR A CORE NETWORK

(71) Applicant: Verizon Patent and Licensing Inc., Basking Ridge, NJ (US)

(72) Inventors: Suzann Hua, Beverly Hills, CA (US); Miguel A. Carames, Long Valley, NJ (US); Ye Huang, San Ramon, CA (US); Parry Cornell Booker, Sunnyvale, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 372 days.

(21) Appl. No.: 17/663,052

(22) Filed: May 12, 2022

(65) Prior Publication Data

US 2023/0370962 A1  Nov. 16, 2023

(51) Int. Cl.
*H04W 48/18* (2009.01)
*H04W 8/02* (2009.01)
(Continued)

(52) U.S. Cl.
CPC ............. *H04W 48/18* (2013.01); *H04W 8/02* (2013.01); *H04W 48/16* (2013.01); *H04W 76/10* (2018.02); *H04W 76/18* (2018.02)

(58) Field of Classification Search
CPC ..... H04W 48/18; H04W 76/18; H04W 76/10; H04W 8/02; H04W 48/16
See application file for complete search history.

(56) References Cited

U.S. PATENT DOCUMENTS

| | | | |
|---|---|---|---|
| 2009/0028159 A1* | 1/2009 | Boudreau | H04L 47/782 370/395.21 |
| 2023/0370950 A1* | 11/2023 | Shekhar | H04W 48/18 |

(Continued)

OTHER PUBLICATIONS

3GPP TS 23.501 V17.4.0, "3rd Generation Partnership Project; Technical Specification Group Services and System Aspects; System architecture for the 5G System (5GS); Stage 2 (Release 17)," Mar. 2022.

(Continued)

*Primary Examiner* — Ricky Q Ngo
*Assistant Examiner* — Stephen N Steiner

(57) ABSTRACT

A system described herein may receive a request to establish a communication session between a core network and a User Equipment ("UE"), determine that the requested communication session is associated with one or more admission control options and receive, from the UE, a selection of a particular admission control option of the one or more admission control options. The system may identify one or more actions associated with the particular admission control option. The one or more actions include rejecting the request to establish the communication session, or accepting the request to establish the communication session. The system may perform the one or more identified actions associated with the particular admission control option. The system may include an interface between an Access and Mobility Management Function ("AMF") of the core network and a Network Slice Access Control Function ("NSACF") of the core network.

20 Claims, 10 Drawing Sheets

(51) Int. Cl.
*H04W 48/16* (2009.01)
*H04W 76/10* (2018.01)
*H04W 76/18* (2018.01)

(56) References Cited

U.S. PATENT DOCUMENTS

2024/0015567 A1* 1/2024 Mladin ............. H04W 28/0268
2024/0089844 A1* 3/2024 Gundavelli ........... H04W 60/00

OTHER PUBLICATIONS

3GPP TS 29.274 V17.5.0, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3; (Release 17)," Mar. 2022.

* cited by examiner

201

| AF ID | UE ID(s) | Admission control options | Time in effect |
|---|---|---|---|
| AF 101-1 | UE 103-1, UE 103-2, UE 103-3 | | [Start time, stop time] |
| AF 101-2 | UE 103-2, UE 103-4, UE 103-5 | | [Start time, stop time] |
| AF 101-2 | UE 103-1, UE 103-3 | | [Start time, stop time] |

203-1

| Option | Description | Admission control action |
|---|---|---|
| 1 | Extra hourly fee for immediate access | Allow access |
| 2 | Postpone access for 1 hour for account credit | Reject access; initiate 1-hour timer |
| 3 | Postpone access for 3 hours for account credit | Reject access; initiate 3-hour timer |

203-2

| Option | Description | Admission control action |
|---|---|---|
| 1 | No extra fee for immediate access | Allow access |
| 2 | Postpone access for 2 hours for account credit | Reject access; initiate 2-hour timer |

FIG. 2

| AF ID | Slice ID | UE ID(s) | Time in effect | Admission control options |
|---|---|---|---|---|
| AF 101-1 | Slice_A | UE 103-1, UE 103-2, UE 103-3 | [Start time, stop time] | [Options] |
| AF 101-1 | Slice_B | UE 103-1, UE 103-2, UE 103-3 | [Start time, stop time] | [Options] |
| AF 101-2 | Slice_A | UE 103-3 | [Start time, stop time] | [Options] |
| AF 101-2 | Slice_A | UE 103-2, UE 103-4, UE 103-5 | [Start time, stop time] | [Options] |

FIG. 6

SYSTEMS AND METHODS FOR APPLICATION FUNCTION-INITIATED ADMISSION CONTROL FOR A CORE NETWORK

BACKGROUND

Wireless networks may include and/or may be communicatively coupled to a core network, which may provide for routing or other services associated with the wireless network. For example, a Fifth Generation ("5G") network may include a 5G core ("5GC"), which may include multiple network functions in order to provide services to User Equipment ("UEs") that are associated with communication sessions (e.g., protocol data unit ("PDU") sessions) with the 5GC. The 5GC may include one or more network slices, where each slice is associated with a different set of traffic treatment parameters, priorities, etc. The 5GC may include a network function that tracks the quantity of PDU sessions associated with a given slice.

BRIEF DESCRIPTION OF THE DRAWINGS

FIG. 2 illustrates example data structures that may be used in accordance with some embodiments;

FIG. 6 illustrates an example data structure that may be used in accordance with some embodiments;

DETAILED DESCRIPTION OF EXAMPLE EMBODIMENTS

Figure 1:
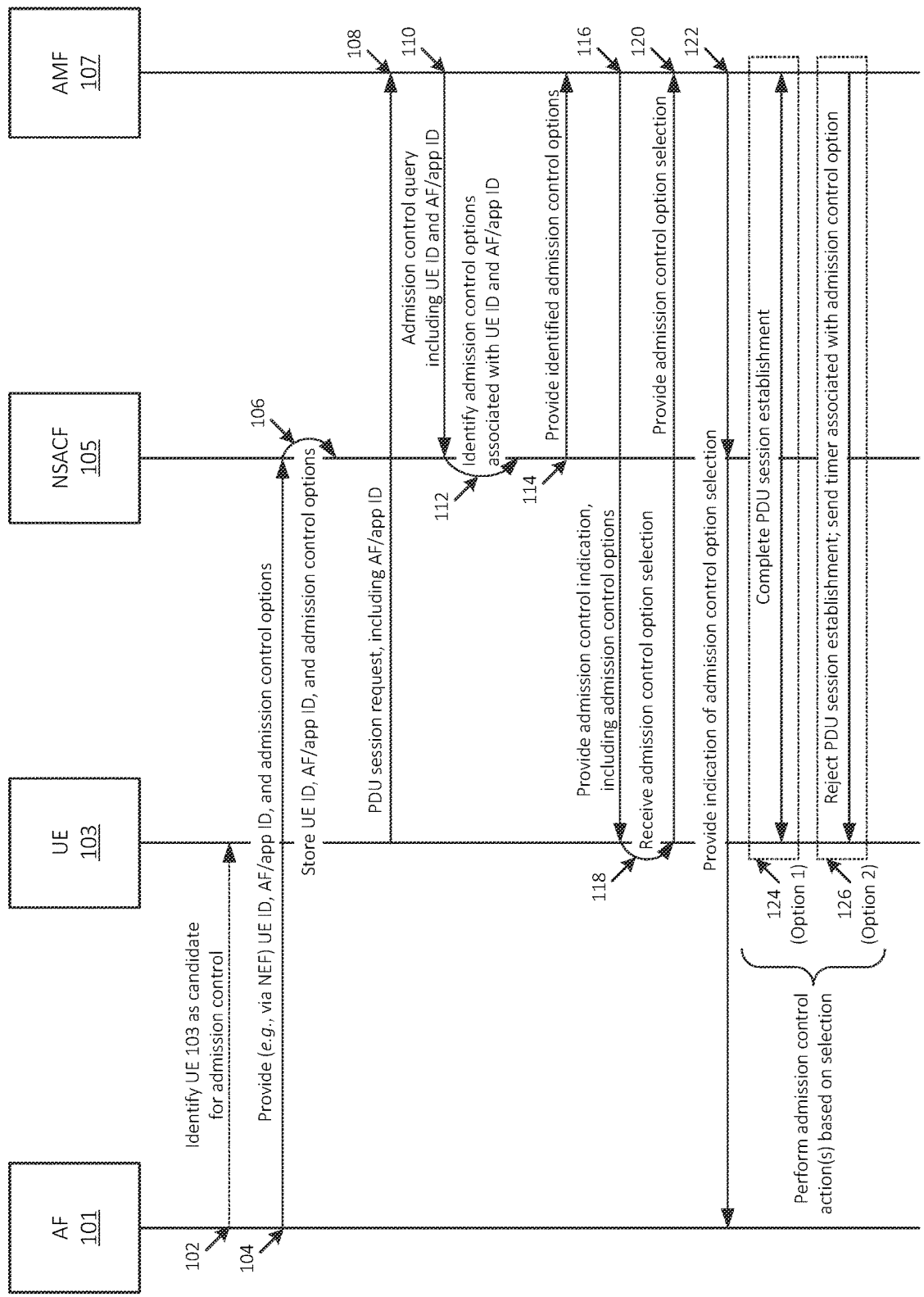
FIG. 1 illustrates an example overview of one or more embodiments described herein.

The following detailed description refers to the accompanying drawings. The same reference numbers in different drawings may identify the same or similar elements.

Service providers, such as streaming content providers, gaming providers, augment reality providers, etc. may include servers, datacenters, portals, and/or other types of devices or systems that communicate with UEs, such as mobile phones, tablets, laptop computers, etc. via one or more networks. The one or more networks may include a wireless network, such as network that includes and/or is communicatively coupled to one or more RANs and/or one or more core networks that are communicatively coupled to the one or more RANs. For example, a 5GC may be a communicatively coupled to a 5G RAN (e.g., in a standalone ("SA") architecture), a Long-Term Evolution ("LTE") RAN (e.g., in a non-standalone ("NSA") architecture), the Internet, and/or one or more other networks via which a given UE may receive wireless service.

Situations may arise in which a given service provider may wish to limit the quantity of UEs that communicate with resources of the service provider (e.g., with one or more application servers, content servers, datacenters, etc.). For example, resources of the service provider may be overloaded, resources of the service provider may be undergoing maintenance or updates, resources of the service provider may have failed or otherwise become unreachable, etc. As provided herein, some embodiments may provide for service providers to communicate with elements of a core network (e.g., a 5GC) in order to limit, manage, etc. the quantity of UEs that are able to communicate with the service providers via the core network. In other words, embodiments provided herein allow for devices or systems, which are external to the core network, to initiate or request access control techniques, whereby the core network may accept or reject connection requests for UEs that are attempting to communicate with the service providers via the core network.

In this manner, the service providers may be able to manage traffic to or from service provider systems, while minimizing the use of network resources in situations where such service provider systems would otherwise reject communication requests associated with such UEs. For example, as discussed below, service providers may be able to cause the core network to reject incoming communication requests (e.g., PDU session establishment requests) from UEs attempting to communicate with the service providers, which may result in less time and fewer network resources being consumed than implementations in which the core network allows for the establishment of the communication session and then the service provider subsequently rejects a communication request from the UEs and/or otherwise de-prioritizes or forgoes communicating with the UEs.

In some embodiments, one or more elements of a 5GC (e.g., an Access and Mobility Management Function ("AMF"), a Network Slice Access Control Function ("NSACF"), a Network Exposure Function ("NEF"), and/or one or more other elements may be involved in the techniques described herein. Additionally, or alternatively, functionality of such elements of the 5GC may be enhanced in order to provider for the techniques described herein.

As shown in FIG. 1, for example, Application Function ("AF") 101 may identify (at 102) one or more UEs 103 as candidates for admission control. AF 101, as referred to herein, may be a device or system that is associated with a particular service provider. For example, AF 101 may be, may include, and/or may be communicatively coupled to one or more servers, cloud systems, datacenters, etc. associated with a particular service provider. As referred to herein, "admission control" may refer to techniques in which communication sessions (e.g., PDU sessions) between one or more UEs 103 and a core network (e.g., a 5GC) are selectively established or denied based on criteria, conditions, instructions, etc. provided by AF 101. Requests for such communication sessions (e.g., as requested by UEs 103) may include an identifier of AF 101, an identifier of an application or service provided by AF 101, one or more network slices of the core network, and/or other suitable information. AF 101 may identify (at 102) identifiers of UEs 103 (e.g., Mobile Directory Number ("MDNs")) and/or of users, user accounts, user names, etc. for which admission control may potentially be performed, as discussed herein. For example, AF 101 may identify UEs 103, users, user accounts, etc. that send and/or receive a relatively large amount of traffic to and/or from AF 101 (e.g., greater than a threshold, and/or a greater amount than other UEs 103, users, etc.). As another example, AF 101 may receive indications or selections from such UEs 103, users, etc. that such UEs 103, users, etc. have opted in to admission control techniques described herein. As another example, AF 101 may randomly select one or more UEs 103, users, etc.

AF 101 may provide (at 104) information indicating one or more identifiers 103 of the identified (at 102) UE(s) 103 to one or more elements of a core network, such as NSACF 105 of a 5GC. For example, AF 101 and/or NSACF 105 may implement an application programming interface ("API") or other suitable communication pathway via which AF 101 and NSACF 105 may communicate. In some embodiments, AF 101 and NSACF 105 may communicate via a NEF, which may serve as an interface between elements of the core network (e.g., NSACF 105 and/or other network functions) and external devices or systems (e.g., AF 101 and/or other devices or systems). In some embodiments, AF 101 may not specifically be "aware" of NSACF 105. For example, AF 101 may provide (at 104) the information to a NEF of the core network, which may accordingly forward, route, etc. the information to NSACF 105. In some embodiments, the NEF, NSACF 105, and/or some other suitable device or system may authenticate AF 101 and/or may otherwise verify that AF 101 is authorized to request admission control techniques for the indicated UEs 103.

In some embodiments, the information provided (at 104) by AF 101 may include one or more identifiers of the identified UEs 103, an identifier of AF 101 and/or of one or more applications associated with AF 101, and a set of admission control options associated with AF 101 and the identified UEs 103. NSACF 105 may store (at 106) the received information, which may be used (e.g., as discussed below) in providing admission control techniques for one or more of the identified UEs 103 when such UEs 103 attempt to connect to the core network to communicate with AF 101.

FIG. 2 illustrates an example data structure 201, reflecting example information that may be provided to (at 104) and/or maintained by (at 106) NSACF 105. As shown, for example, data structure 201 may include fields for an identifier of respective AFs 101 ("AF ID"), UEs 103 ("UE ID(s)"), admission control criteria (e.g., "time in effect"), and admission control options.

The AF identifiers may include names, Internet Protocol ("IP") addresses, and/or other suitable identifiers of respective AFs 101 (represented in the figure as "AF 101-1" and "AF 101-2"). Additionally, or alternatively, the AF identifiers may include names and/or other identifiers associated with applications, traffic types, Access Point Names ("APNs"), labels, etc. associated with one or more services provided by respective AFs 101.

The UE identifiers may include MDNs, IP addresses, user names or account names (e.g., where such user or account names are maintained or provided by AF 101), and/or other identifiers that are accessible to AFs 101. In some embodiments, the UE identifiers may include UE identifiers that are not accessible to, and/or which otherwise have not been provided (e.g., at 104) by AFs 101. Such identifiers may include a Subscription Permanent Identifier ("SUPI"), an International Mobile Station Equipment Identity ("IMEI"), an International Mobile Subscriber Identity ("IMSI"), or the like, that is associated with one or more particular UEs 103. For example, NSACF 105, a NEF, or other suitable device or system may maintain information associating SUPIs, IMSIs, IMEIs, etc. to MDNs, IP addresses, user names or account names, etc. that may be provided (at 104) by AFs 101.

The admission control criteria may specify conditions, criteria, etc. based on which admission control techniques described herein may be performed. For example, the admission control criteria may include a start time, a stop time, a duration, and/or other temporal conditions. In practice, other types of criteria may be used in addition to, or in lieu of, temporal conditions (e.g., network load conditions and/or other conditions).

In this manner, multiple UEs 103 may be associated with the same set of admission control options and/or admission control criteria for the same AF 101. Additionally, the same AF 101 may have different admission control options and/or admission control criteria for different UEs 103. For example, as shown, AF 101-2 may be associated with a first set of admission control criteria and/or options for a first set of UEs 103 (e.g., UEs 103-2, 103-4, and 103-5), and may be associated with a second set of admission control criteria and/or options for a second set of UEs 103 (e.g., UEs 103-1 and 103-3).

The admission control options may each include and/or may be associated with a description as well as one or more actions. For example, data structures 203-1 and 203-2 may reflect particular sets of admission control options associated with respective AFs 101, UEs 103, and admission control criteria. For example, data structure 203-1 may reflect a set of admission control options that includes three example admission control options associated with AF 101-1 (e.g., which may apply to UEs 103-1, 103-2, and 103-3 when attempting to communicate with AF 101-1 during times that correspond to particular temporal criteria).

The "description" indicated in data structures 203 may include text, metadata, etc. associated with respective options. In some embodiments, the description may include text that may be provided to respective UEs 103 when such UEs 103 attempt to communicate with respective AFs 101 while admission control criteria is satisfied (e.g., during a corresponding time period indicated in data structure 201). As discussed below, UEs 103 may present one or more selectable options, which may include presenting some or all of the description associated with each option, and users of UEs 103 may select such options in order to specify a manner in which such users wish to communicate with respective AFs 101.

For example, a first admission control option, as indicated in data structure 203-1, may include a description indicating that the first admission control option is associated with an extra hourly fee for immediate access. Additionally, a second admission control option indicated in data structure 203-1 may include a description indicating that the second admission control option is associated with an account credit if the user is willing to postpone access (e.g., wait) for one hour, while a third admission control option indicated in data structure 203-1 may include a description indicating that the third option is associated with an account credit (e.g., a greater account credit) if the user is willing to postpone access (e.g., wait) for three hours. The "fees" and "credits" provided as examples herein may be assessed by respective AFs 101, as discussed herein. In some embodiments, other types of incentives, rewards, offers, fees, charges, etc. may be provided, assessed, implemented, etc. by respective AFs 101.

As further shown, the first admission control option, as indicated in data structure 203-1, may be associated with an admission control action of "allow access." For example, as discussed below, when the first option is selected via a given UE 103, a core network may allow UE 103 to establish one or more communication sessions (e.g., PDU sessions or other suitable types of communication sessions) with the core network in order to communicate with AF 101. The second admission control option may be associated with an action of "reject access," where selection of the second admission control option may cause the core network to reject, deny, and/or otherwise disallow UE 103 from establishing a requested communication session with the core network to communicate with AF 101. The second admission control option may further be associated with an action of "initiate 1-hour timer," which may cause the core network to indicate to UE 101 that UE 101 is not authorized to establish the requested communication session for one hour. Additionally, or alternatively, the core network may maintain, start, etc. a timer indicating that communication requests from the particular UE 101, to communicate with the particular AF 101 during a one-hour period following the selection of the second admission control option, should be rejected. While the admission control actions are shown in FIG. 2 as plain text for the sake of explanation, in practice, the admission control actions may be specified by machine code, API calls, etc.

Returning to FIG. 1, at some subsequent time, UE 103 may request (at 108) the establishment of one or more communication sessions with core network, such as a PDU session. For example, UE 103 may output a PDU session establishment request to AMF 107 when attempting to communicate with AF 101. Additionally, or alternatively, UE 103 may output the PDU session establishment request when attempting to communicate with AF 101 using a particular application, traffic type, or network slice. For example, while UE 103 may be able to communicate with AF 101 via an already existing PDU session, such as a "best effort" PDU session or some other PDU session, the requested PDU session may include parameters (e.g., Quality of Service ("QoS") parameters, Service Level Agreements ("SLAs"), etc.), may be associated with a particular network slice, etc. via which traffic may be prioritized or otherwise handled differently from a "best effort" PDU session or some other PDU session.

In some embodiments, UE 103 may output the PDU session establishment request when an application associated with AF 101 is opened, executed, etc. at UE 103. As another example, a service offered by AF 101 may include a messaging service, and the PDU establishment request may be sent by UE 103 when an application executing at UE 103 receives an outbound message (e.g., from a user of UE 103) to send to AF 101. As yet another example, UE 103 may output the PDU session establishment request when connecting to a RAN that is communicatively coupled to AMF 107, and/or at some other suitable time and/or based on one or more other triggering events.

UE 103 may, for example, communicate with AMF 107 via an N1 interface, using Non-Access Stratum ("NAS") signaling, etc. In some embodiments, the PDU session establishment request may include an identifier of AF 101 (e.g., a name, an IP address, a label, etc.), an identifier of an application or traffic type associated with AF 101, and/or other suitable information. The PDU session establishment request may include an identifier of UE 103, such as a SUPI, an IMSI, an IMEI, and/or some other suitable identifier of UE 103.

In accordance with some embodiments, AMF 107 may output (at 110) an admission control query to NSACF 105. For example, AMF 107 and NSACF 105 may communicate via an API or other suitable interface, in accordance with some embodiments. The admission control query may include an identifier of UE 103 as well as an identifier of AF 101 and/or an application or traffic type with which the request, as provided (at 108) by UE 103, is associated.

Based on receiving (at 110) the admission control query, NSACF 105 may identify (at 112) admission control options associated with the particular UE 103, AF 101, and/or the indicated application or traffic type. For example, NSACF 105 may perform a lookup on data structure 201 to identify a set of admission control options (e.g., a particular instance of data structure 203) that are associated with an identifier of UE 103, AF 101, and/or a traffic type or service associated with AF 101. Assuming that NSACF 105 is able to identify (at 112) a corresponding set of admission control options for UE 103 and AF 101, NSACF 105 may provide (at 114) the identified set of admission control options to AMF 107. For example, as discussed above, NSACF 105 and AMF 107 may implement one or more APIs, protocols, or other communication pathways via which AMF 107 may communicate.

Based on receiving (at 114) the admission control options associated with the requested communication session (e.g., associated with UE 103 and AF 101), AMF 107 may provide (at 116) an admission control indication to UE 103, including the admission control options (e.g., as identified at 112 by NSACF 105). For example, AMF 107 and UE 103 may implement one or more APIs, protocols, or other communication pathways via which AMF 107 may provide such information. In some embodiments, AMF 107 may provide (at 116) the admission control indication via N1 signaling, NAS signaling, or the like. In some embodiments, AMF 107 may provide the admission control indication via an Extended Protocol Configuration Options ("ePCO") information element ("IE") (e.g., in situations where UE 103 supports ePCO messaging).

Figure 3:
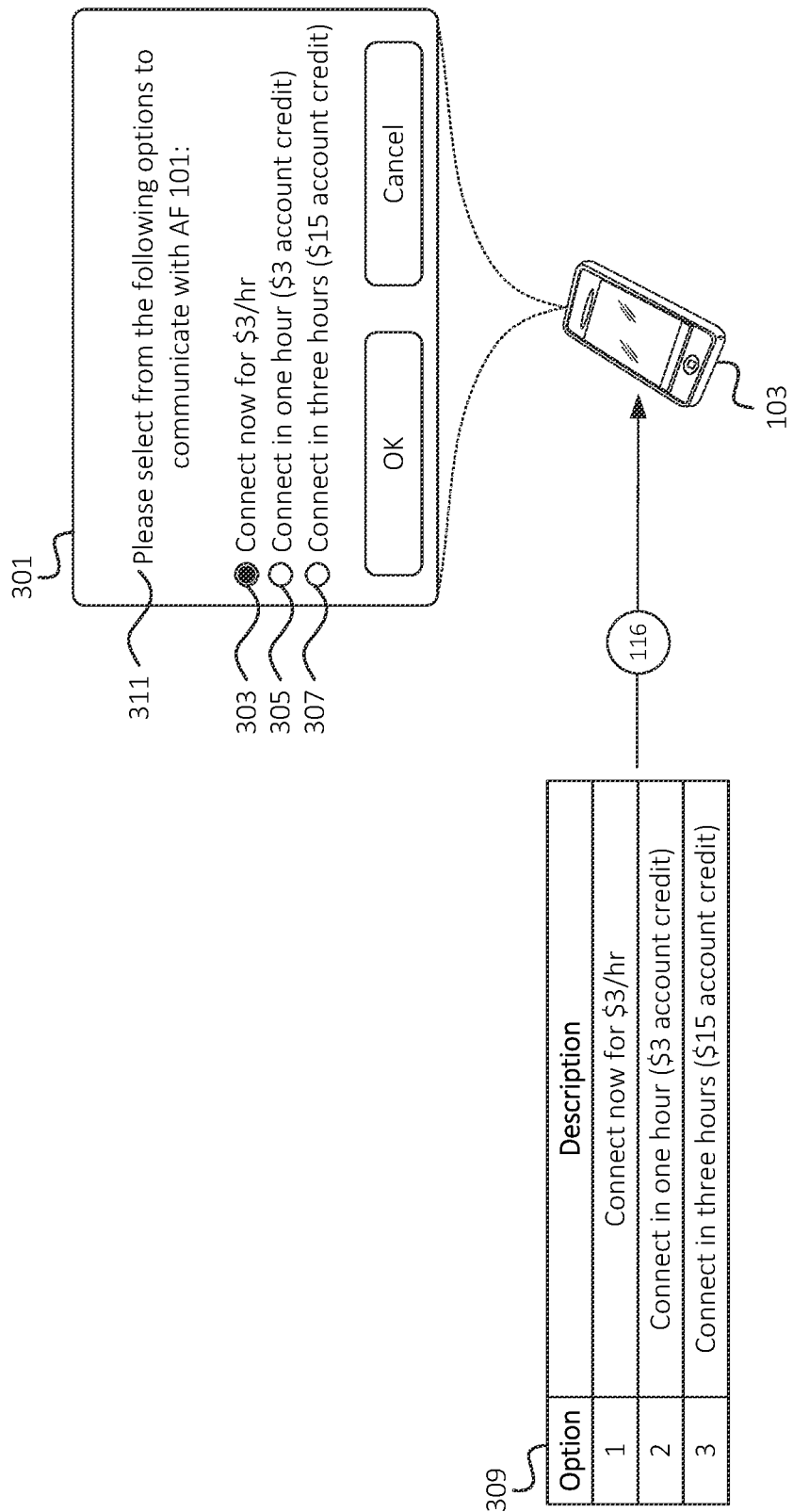
FIG. 3 illustrates an example graphical user interface ("GUI") that may be used to present or receive admission control options, in accordance with some embodiments.

Based on receiving the admission control indication, UE 103 may present some or all of the admission control options for selection by a user. For example, as shown in FIG. 3, UE 103 may present GUI 103, which may include selectable options (e.g., selectable options 303, 305, and 307) that are each associated with a respective admission control option. Example data structure 309 may include or may represent the admission control options provided to UE (e.g., at 116). For example, each admission control option may be presented with an identifier of each respective admission control option (e.g., "1," "2," and "3" in this example), as well as a description, text, etc. associated with each respective admission control option. In some embodiments, the "description" field of data structure 309 may include a link, Uniform Resource Locator ("URL"), etc., based on which text, images, or other resources may be obtained by UE 103.

GUI 301 may include, for each received admission control option, a respective selectable option as well as a description of each admission control option. For example, the first admission control option shown in data structure 309 may be presented by UE 103 (e.g., via GUI 301) with selectable option 303 as well as the associated text "Connect now for $3/hr." The second admission control option shown in data structure 309 may be presented by UE 103 with selectable option 305 as well as the associated text "Connect in one hour ($3 account credit)," and the third admission control option shown in data structure 309 may be presented by UE 103 with selectable option 307 as well as the associated text "Connect in three hours ($15 account credit) ." In instances where the description for one or more admission control options (e.g., in data structure 309) includes a link, URL, etc., UE 103 may retrieve one or more resources (e.g., images, videos, audio files, text, etc.) using such link, URL, etc., and may present the one or more resources via GUI 301, via a speaker of UE 103, and/or one or more other suitable output devices.

GUI 301 may also include indication 311, indicating that selectable options 303, 305, and 307 are associated with communications between UE 103 and a particular AF 101. For example, the admission control indication (received at 116) may include an identifier of AF 101, and/or may include a reference or identifier associated with the session establishment request sent (at 108) by UE 103, based on which UE 103 may identify that the received admission control indication is associated with AF 101.

In some embodiments, UE 103 may automatically select a particular admission control option, without presenting such options to the user after receiving (at 116) the admission control indication. For example, the user may have previously provided a user preference, set of parameters, etc., based on which UE 103 may automatically select one of the admission control options. Additionally, or alternatively, UE 103 may utilize artificial intelligence/machine learning ("AI/ML") techniques or other predictive techniques in order to automatically identify a selection that the user would be likely to select. Additionally, or alternatively, UE 103 may utilize other suitable techniques to automatically select a particular admission control option, without user interaction.

Returning to FIG. 1, UE 103 may receive (at 118) a selection of a particular admission control option. For example, a user of UE 103 may select a particular selectable option (e.g., selectable option 303, 305, or 307, referring to the example of FIG. 3). Based on receiving the selection of the particular admission control option, UE 103 may provide (at 120) an indication of the selected admission control option to AMF 107. For example, referring to the example of FIG. 3, assume that selectable option 303 is selected by the user. Based on the selection of selectable option 303, UE 103 may output an identifier of the selected admission control option (e.g., "option 1" in this example).

In some embodiments, UE 103 may include an identifier or reference to the session establishment request previously sent (at 108) by UE 103. Additionally, or alternatively, UE 103 may provide an identifier of AF 101 with the admission control selection. Additionally, or alternatively, AMF 107 may determine that the received admission control option is associated with the session establishment request previously sent (at 108) by UE 103 in some other suitable manner.

AMF 107 may output (at 122) an indication of the admission control option selection to AF 101. For example, in some embodiments, AMF 107 may output such indication to NSACF 105 with an identifier of AF 101, based on which NSACF 105 may forward the indication to AF 101 (e.g., via a NEF or other suitable device, system, or communication pathway). The indication may further include an identifier of UE 103, such as a SUPI, an IMSI, an IMEI, etc. (e.g., where such identifier may not be "visible" to or accessible by AF 101. NSACF 105, the NEF, and/or some other suitable device or system may maintain a mapping between such identifiers and identifiers that are "visible" or accessible to AF 101, such as an IP address, an MDN, a user name, etc. Additionally, or alternatively, the indication provided by AMF 107 may include an identifier of UE 103, or a user of UE 103, that is accessible to AF 101 (e.g., the IP address, MDN, etc.).

In this manner, AF 101 may become "aware" of the selected admission control option associated with UE 103. AF 101 may maintain information associated with the admission control options, such as the example information shown in data structures 203 and/or 309. For example, AF 101 may receive an identifier of a particular admission control option (e.g., "option 1," "option 2," etc.), and may identify appropriate actions to take with respect to UE 103 and/or a user or account associated with UE 103 based on the selected admission control option. For example, as discussed above, such actions may include charging or debiting an account associated with UE 103 or the user, crediting an account associated with UE 103 or the user, providing rewards or incentives to UE 103 or the user, etc.

Additionally, AMF 107 may perform one or more actions associated with the selected admission control option (e.g., as indicated in data structure 201. As one example, if the actions associated with the selected admission control action include an "allow access" action (or other similar action), AMF 107 may complete, and/or otherwise proceed with (at 124), the requested communication session establishment. For example, AMF 107 may communicate with a Session Management Function ("SMF") or other suitable device or system to establish a PDU session between UE 103 and one or more other elements of the core network, such as a User Plane Function ("UPF"), where such PDU session is used to carry traffic between AF 101 and UE 103. As noted above, in instances where this option is associated with an additional charge, debit, etc., such charge or debit may be assessed by AF 101 (e.g., independently the core network).

On the other hand, if the admission control action includes a "reject access" action (or other similar action), AMF 107 may reject (at 126) the requested communication session establishment. In this manner, UE 103 may not be able to communicate with AF 101 via the requested communication session. Further, in situations where the admission control action includes an "initiate timer" action or other similar action), AMF 107 may initiate the timer (e.g., for a time specified by the admission control action) and/or may provide (e.g., via ePCO messaging or other suitable messaging) an indication of the timer duration to UE 103. During such time, UE 103 may refrain from attempting to request a communication session with the same parameters (e.g., with an identifier of AF 101, a particular network slice identifier, or an application or traffic type associated with AF 101).

Figure 4:
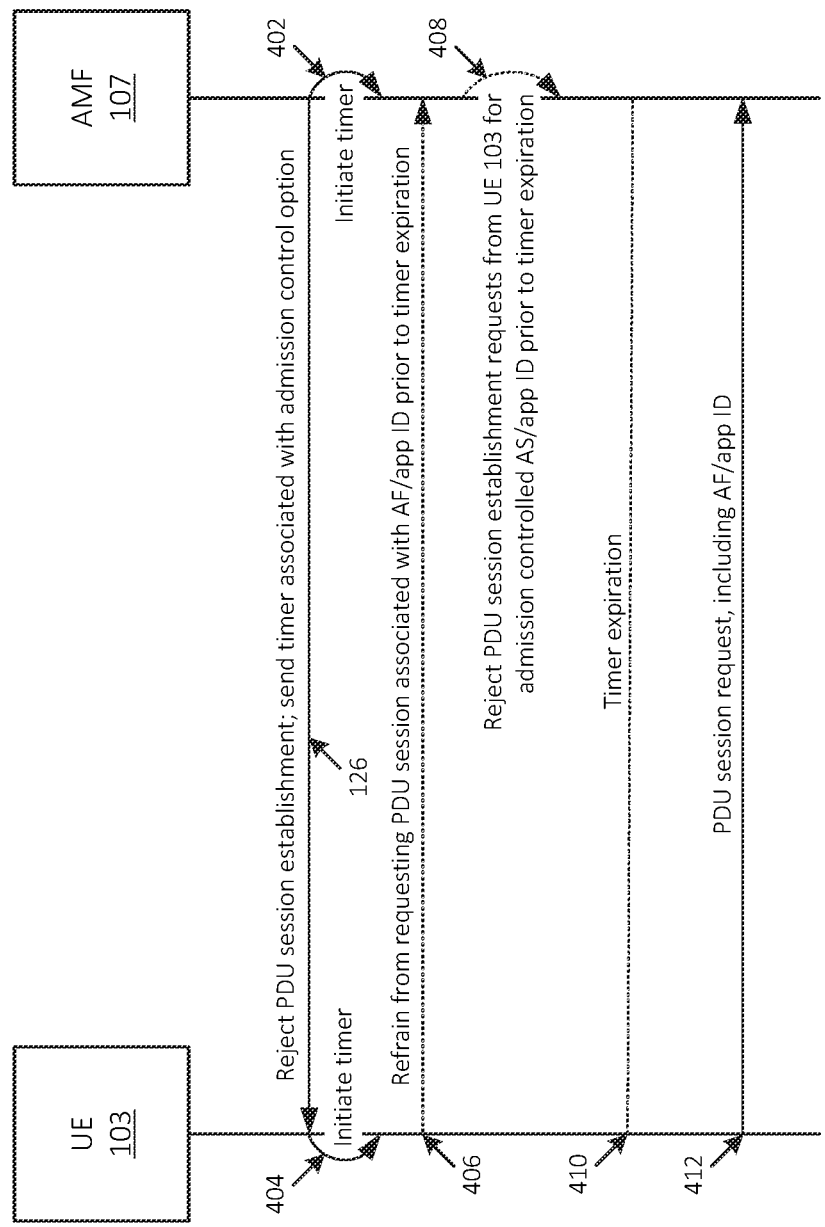
FIG. 4 illustrates an example signal flow for postponing admission of a UE for parameters of a particular communication session establishment request, in accordance with some embodiments.

For example, as shown in FIG. 4, based on rejecting (at 126) the PDU session establishment and indicating a timer associated with such rejection, AMF 107 may initiate (at 402) a timer and/or UE 103 may initiate (at 404) the timer. In some embodiments, only UE 103 may initiate (at 404) the timer, and in some embodiments, only AMF 107 may initiate (at 402) the timer. As noted above, the timer duration may be indicated by an action associated with the particular selected admission control option (e.g., one hour, three hours, etc.).

Prior to the expiration of the timer, UE 103 may refrain (at 406) from requesting a PDU session establishment associated with AF 101 and/or a particular application or traffic type associated with AF 101. In some embodiments, in the absence of such PDU session associated with AF 101, UE 103 may communicate with AF 101 via another PDU session, such as an already established PDU session, a "best effort" PDU session, etc. Thus, as noted above, the rejection (at 126) of the requested PDU session may, in some embodiments, not prohibit UE 103 from communicating with AF 101 at all, but communications between UE 103 and AF 101 may not be associated with the same priority, QoS parameters, etc. as if the PDU session were to have been established.

Additionally, prior to the expiration of the timer, AMF 107 may reject (at 408) PDU session establishment requests from 103, having the same parameters (e.g., identifier of AF 101, identifier of a particular network slice, identifier of a particular application or traffic type, etc.) as the rejected PDU session. For example, UE 103 may send such requests in embodiments where UE 103 does not maintain or initiate (at 404) a timer, sends such a request in error, or otherwise sends the request prior to the expiration of the timer.

In some situations, based on identifying that admission control has been applied to parameters associated with a previous PDU session establishment request, UE 103 may subsequently (e.g., while the timer is running, or after the timer expires) output another PDU session establishment request with different parameters. For example, in some embodiments, the initial PDU session establishment request may have included a request to establish a PDU session associated with a particular network slice, and the rejection of the PDU session establishment request (e.g., based on a selection at UE 103) may be specific to that particular network slice. As such, UE 103 may request another PDU session, for communications between UE 103 and AF 101, that is associated with a different network slice. This subsequent PDU session establishment request may, in some embodiments, be evaluated by NSACF 105, AMF 107, etc. independently of, or in parallel with, the previous PDU session establishment request.

After the timer expires (at 410), UE 103 may output (at 412) a PDU session establishment request, which may have some or all of the same parameters as the previous PDU session establishment request which was rejected (e.g., based on a selection of a particular admission control option at UE 103). For example, the PDU session request (outputted at 412) may specify the same AF 101, network slice, application or traffic type, etc. as specified in the previous PDU session establishment request. In some embodiments, UE 103 may automatically output (at 412) the PDU session establishment request upon expiration (at 410) of the timer. In some embodiments, UE 103 may output the PDU session establishment request at some time after determining that the timer has expired, such as when attempting to output traffic to AF 101 and/or based on some other suitable triggering event.

When receiving (at 412) the PDU session establishment request, AMF 107 may perform some or all of the operations described above (e.g., querying NSACF 105 to determine whether admission control options should be presented to UE 103, performing one or more actions based on a selected admission control option, etc.). In some situations, after the expiration of the timer, the admission control query may yield a different response (e.g., from NSACF 105) than a previous admission control query, based on which NSACF 105 provided admission control options. For example, AF 101 may have provided updated admission control criteria to NSACF 105, previously provided admission control criteria may no longer be applicable, etc.

Figure 5:
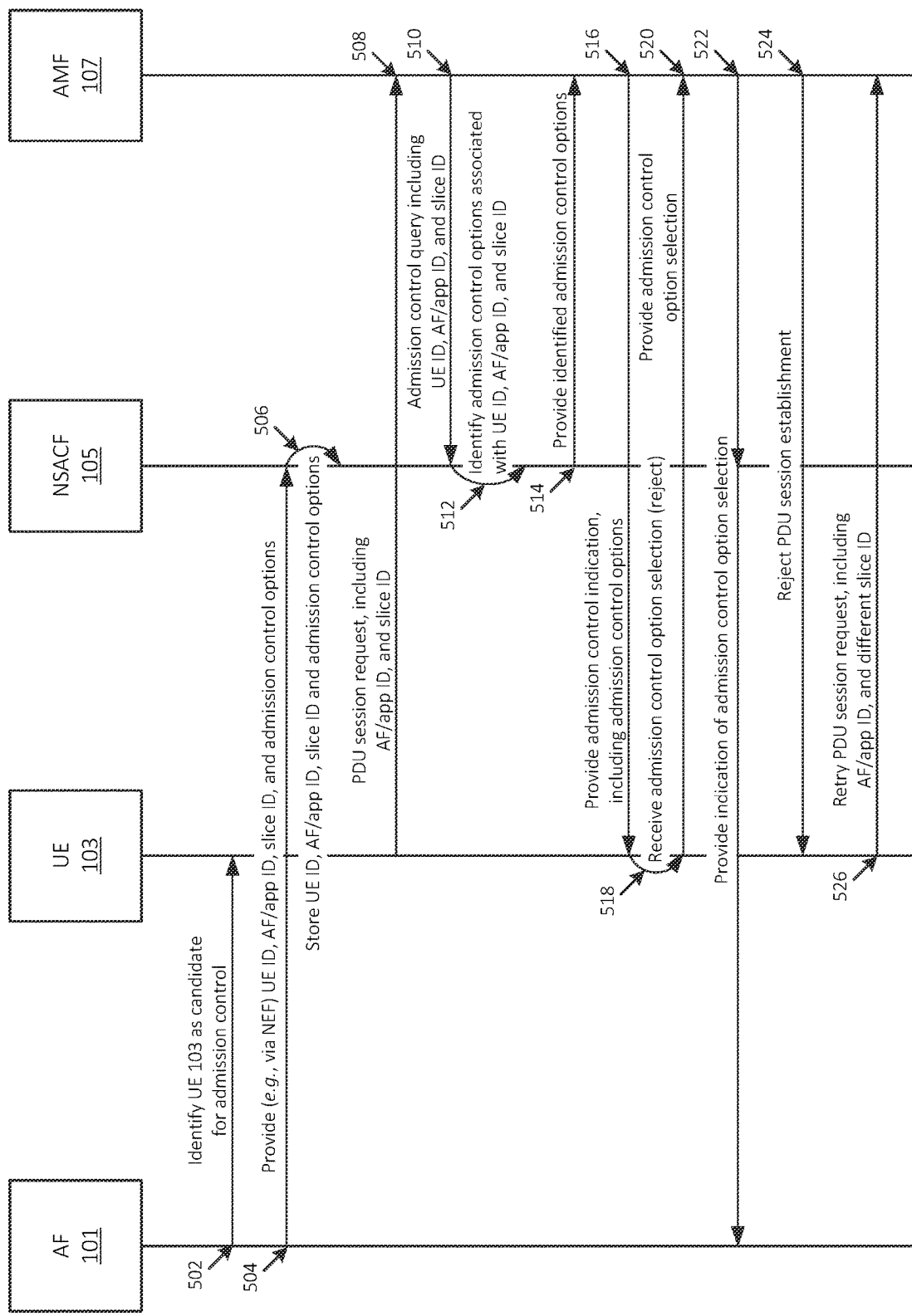
FIG. 5 illustrates an example signal flow for performing admission control based on a communication session establishment request that specifies a network slice, in accordance with some embodiments.

As noted above, communication session requests associated with different network slices (and/or other parameters) may be evaluated independently, such that UE 103 may "fall back" to a different network slice if admission control techniques are applicable to a communication session request associated with a particular network slice. For example, as shown in FIG. 5, UE 103 (and/or one or more other UEs 103) may be identified (at 502) as a candidate for admission control, and AF 101 may provide (at 504) admission control options to NSACF 105, where such admission control options include different options and/or actions for different network slices. NSACF 105 may store (at 506) the admission control information.

For example, as shown in FIG. 6, data structure 601 may indicate admission control options associated with one or more AFs 101 (e.g., AFs 101-1 and 101-2), which include network slice as differentiating criteria. In this example, for example, AF 101-1 may be associated with different admission control information (e.g., sets of UEs 103, admission control criteria, and/or admission control options) for different network slices (e.g., represented as "Slice_A" and "Slice_B"). In some embodiments, the slice identifiers may include a Network Slice Selection Assistance Information ("NSSAI") value or other suitable identifier.

As further shown in FIG. 5, UE 103 may output (at 508) a PDU session establishment request, which may include a slice identifier (e.g., a NSSAI value or other identifier) and an identifier of AF 101. Based on receiving the PDU session establishment request, AMF 107 may output (at 510) an admission control query to NSACF 105, including an identifier of UE 103, AF 101, and the requested network slice. In this example, assume that NSACF 105 identifies that access control techniques apply to the PDU session request (e.g., based on the identifier of UE 103, AF 101, and network slice matching corresponding information in data structure 601). NSACF 105 may accordingly provide (at 514) the identified admission control options to AMF 107. As similarly discussed above, AMF 107 may provide (at 516) the identified admission control options to UE 103, which may receive (at 518) a selection of a particular admission control option. In this example, assume that UE 103 receives a selection based on which authorization of UE 103 to establish the requested PDU session (e.g., via the particular network slice) should be rejected or postponed to a later time.

UE 103 may provide (at 520) the selected admission control option to AMF 107, which may notify (at 522) AF 101 of the selected admission control option, and may perform one or more actions associated with the selected admission control option. In this example, such actions may include rejecting (at 524) the requested PDU session establishment. Based on receiving the indication that the PDU session establishment has been rejected, UE 103 may retry (at 526) the PDU session establishment request with one or more different parameters. For example, UE 103 may output a subsequent session establishment request with an indication of the same AF 101, but with an indication of a different slice identifier.

Based on the subsequent request, some of the above-discussed operations may be performed in order to determine whether admission control criteria apply to the subsequent request. For example, AMF 107 may query NSACF 105 to determine whether admission control criteria apply to the subsequent request, and NSACF 105 may determine (e.g., based on data structure 601) whether any admission control criteria apply to the subsequent request. In situations where admission control criteria do not apply to the request, NSACF 105 may provide an indication to AMF 107 that admission control criteria do not apply to the request, and AMF 107 may proceed to establish the requested session. If, on the other hand, NSACF 105 determines that admission control criteria apply to the subsequent request, NSACF 105 may provide admission control options associated with the subsequent request, in a manner similar to that described above.

Figure 7:
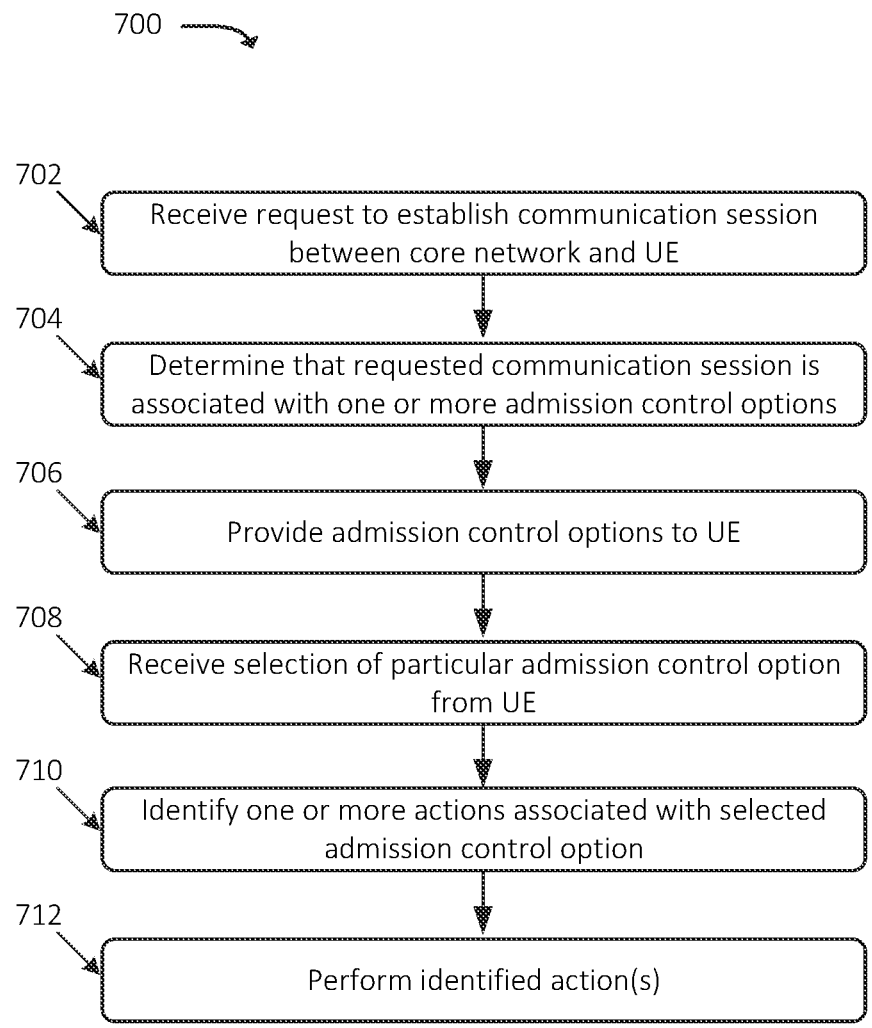
FIG. 7 illustrates an example process for performing admission control based on parameters of a communication session establishment request, in accordance with some embodiments.

FIG. 7 illustrates an example process 700 for performing admission control based on parameters of a communication session establishment request. In some embodiments, some or all of process 700 may be performed by AMF 107. In some embodiments, one or more other devices may perform some or all of process 700 in concert with, and/or in lieu of, AMF 107 (e.g., AF 101, UE 103, and/or NSACF 105).

As shown, process 700 may include receiving (at 702) a request to establish a communication session between a core network and UE 103. For example, UE 103 may output a PDU session establishment request, which may include one or more parameters, such as an identifier of a particular AF 101, an identifier of a particular network slice, an identifier of a particular application or traffic type, and/or other parameters.

Process 700 may further include determining (at 704) that the requested communication session is associated with one or more admission control options. For example, AMF 107 may output a query to NSACF 105 and/or some other suitable device or system, with some or all of the parameters of the request (e.g., an identifier of UE 103, an identifier of AF 101, an identifier of the particular network slice, an identifier of the particular application or traffic type, etc.). NSACF 105 may compare some or all of the attributes of the request to sets of admission control criteria, which may include criteria based on request attributes (e.g., UE identifiers, AF identifiers, network slice identifiers, etc.) and/or other criteria (e.g., temporal criteria or other types of criteria). The sets of admission control criteria may each be associated with a set of admission control options, which may each be associated with a particular set of actions, as discussed above. AMF 107 may receive information indicating the particular admission control options and/or associated sets of actions based on the query.

Process 700 may additionally include providing (at 706) the admission control options to UE 103. For example, as discussed above, AMF 107 may provide such information via an N1 interface, via NAS messaging, as an ePCO IE, and/or in some other suitable manner. The admission control options may include a description, text, links, URLs, etc. that may be presented by UE 103 in order to receive a user selection of a particular admission control option. The description may indicate to the user what action(s) is/are associated with each respective admission control option.

Process 700 may also include receiving (at 708) a selection of a particular admission control option from UE 103. For example, as discussed above, AMF 107 may receive an identifier of a particular admission control option from UE 103 based on a selection at UE 103 (e.g., an automatic selection by UE 103, or a selection by a user of UE 103).

Process 700 may further include identifying (at 710) and performing (at 712) one or more actions associated with the selected admission control option. For example, as discussed above, each admission control option may be associated with one or more actions, such as accepting the communication session establishment request, rejecting the communication session establishment request, initiating one or more timers, etc. In some embodiments, AMF 107 may provide an indication to UE 103 and/or one or more other devices or systems (e.g., AF 101 with which the request is associated) of the selected admission control option. In this manner, such devices or systems may separately provide rewards or incentives for selecting a particular option, assess charges or debits for selecting a particular option, perform analytics based on the selection of a particular option, etc.

Figure 8:
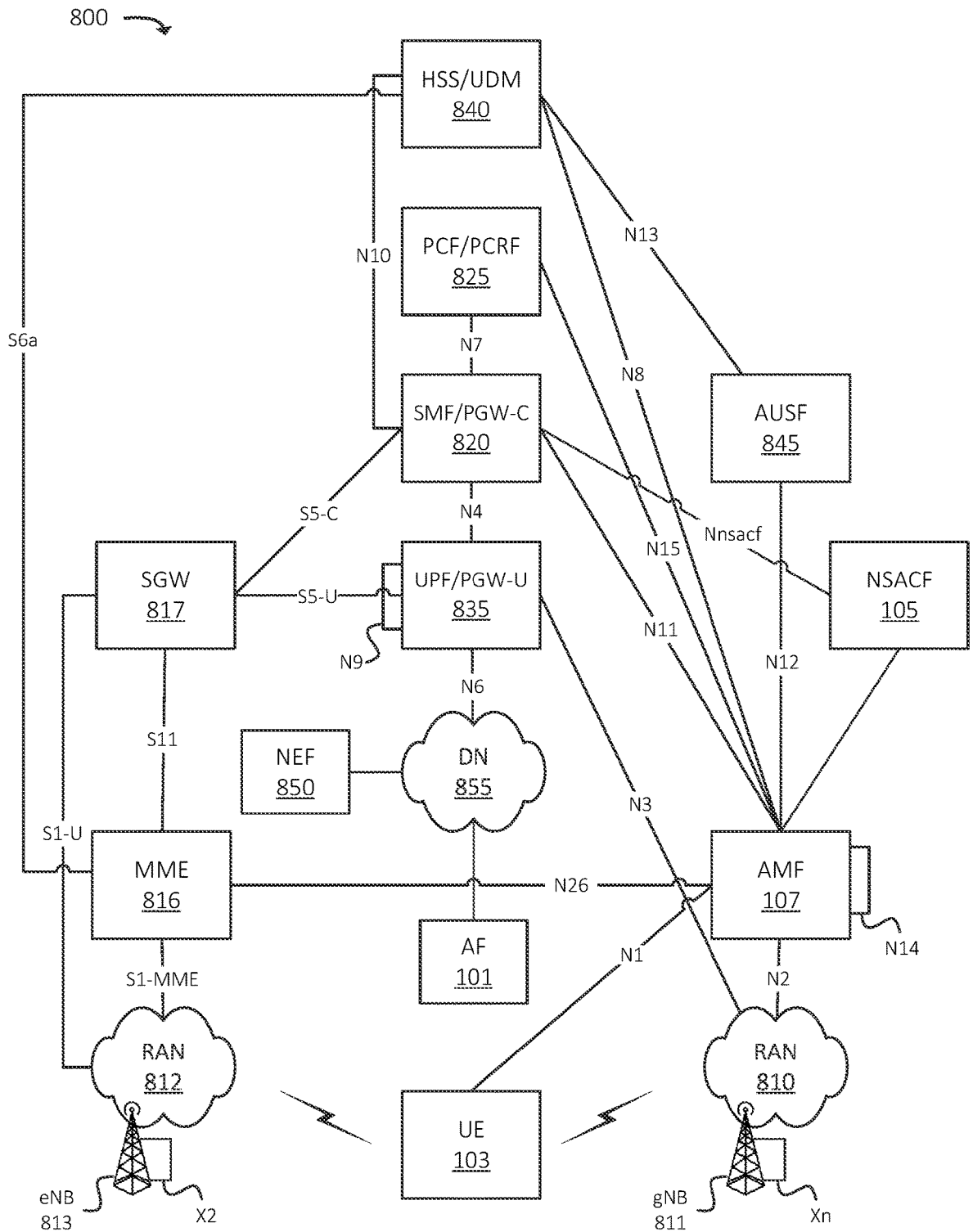
FIG. 8 illustrates an example environment in which one or more embodiments, described herein, may be implemented.

FIG. 8 illustrates an example environment 800, in which one or more embodiments may be implemented. In some embodiments, environment 800 may correspond to a 5G network, and/or may include elements of a 5G network. In some embodiments, environment 800 may correspond to a 5G NSA architecture, in which a 5G radio access technology ("RAT") may be used in conjunction with one or more other RATs (e.g., an LTE RAT), and/or in which elements of a 5G core network may be implemented by, may be communicatively coupled with, and/or may include elements of another type of core network (e.g., an evolved packet core ("EPC")). In some embodiments, portions of environment 800 may represent or may include a 5GC. As shown, environment 800 may include UE 103, RAN 810 (which may include one or more Next Generation Node Bs ("gNBs") 811), RAN 812 (which may include one or more evolved Node Bs ("eNBs") 813), and various network functions such as AMF 107, Mobility Management Entity ("MME") 816, Serving Gateway ("SGW") 817, SMF/Packet Data Network ("PDN") Gateway ("PGW")-Control plane function ("PGW-C") 820, Policy Control Function ("PCF")/Policy Charging and Rules Function ("PCRF") 825, AF 101, UPF/PGW-User plane function ("PGW-U") 835, Unified Data Management ("UDM")/Home Subscriber Server ("HSS") 840, Authentication Server Function ("AUSF") 845, and NEF 850. Environment 800 may also include one or more networks, such as Data Network ("DN") 855. Environment 800 may include one or more additional devices or systems communicatively coupled to one or more networks (e.g., DN 855).

The example shown in FIG. 8 illustrates one instance of each network component or function (e.g., one instance of SMF/PGW-C 820, PCF/PCRF 825, UPF/PGW-U 835, UDM/HSS 840, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of SMF/PGW-C 820, PCF/PCRF 825, UPF/PGW-U 835, UDM/HSS 840, and/or AUSF 845, while another slice may include a second instance of SMF/PGW-C 820, PCF/PCRF 825, UPF/PGW-U 835, UDM/HSS 840, and/or AUSF 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 103 may include a computation and communication device, such as a wireless mobile communication device that is capable of communicating with RAN 810, RAN 812, and/or DN 855. UE 103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 103 may send traffic to and/or receive traffic (e.g., user plane traffic) from DN 855 via RAN 810, RAN 812, and/or UPF/PGW-U 835.

RAN 810 may be, or may include, a 5G RAN that includes one or more base stations (e.g., one or more gNBs 811), via which UE 103 may communicate with one or more other elements of environment 800. UE 103 may communicate with RAN 810 via an air interface (e.g., as provided by gNB 811). For instance, RAN 810 may receive traffic (e.g., voice call traffic, data traffic, messaging traffic, signaling traffic, etc.) from UE 103 via the air interface, and may communicate the traffic to UPF/PGW-U 835, and/or one or more other devices or networks. Similarly, RAN 810 may receive traffic intended for UE 103 (e.g., from UPF/PGW-U 835, AMF 107, and/or one or more other devices or networks) and may communicate the traffic to UE 103 via the air interface.

RAN 812 may be, or may include, a LTE RAN that includes one or more base stations (e.g., one or more eNBs 813), via which UE 103 may communicate with one or more other elements of environment 800. UE 103 may communicate with RAN 812 via an air interface (e.g., as provided by eNB 813). For instance, RAN 810 may receive traffic (e.g., voice call traffic, data traffic, messaging traffic, signaling traffic, etc.) from UE 103 via the air interface, and may communicate the traffic to UPF/PGW-U 835, and/or one or more other devices or networks. Similarly, RAN 810 may receive traffic intended for UE 103 (e.g., from UPF/PGW-U 835, SGW 817, and/or one or more other devices or networks) and may communicate the traffic to UE 103 via the air interface.

AMF 107 may include one or more devices, systems, Virtualized Network Functions ("VNFs"), Cloud-Native Network Functions ("CNFs"), etc., that perform operations to register UE 103 with the 5G network, to establish bearer channels associated with a session with UE 103, to hand off UE 103 from the 5G network to another network, to hand off UE 103 from the other network to the 5G network, manage mobility of UE 103 between RANs 810 and/or gNBs 811, and/or to perform other operations. In some embodiments, the 5G network may include multiple AMFs 107, which communicate with each other via the N14 interface (denoted in FIG. 8 by the line marked "N14" originating and terminating at AMF 107).

MME 816 may include one or more devices, systems, VNFs, CNFs, etc., that perform operations to register UE 103 with the EPC, to establish bearer channels associated with a session with UE 103, to hand off UE 103 from the EPC to another network, to hand off UE 103 from another network to the EPC, manage mobility of UE 103 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 103. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 101 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 103, from DN 855, and may forward the user plane data toward UE 103 (e.g., via RAN 810, SMF/PGW-C 820, and/or one or more other devices). In some embodiments, multiple UPFs 835 may be deployed (e.g., in different geographical locations), and the delivery of content to UE 103 may be coordinated via the N9 interface (e.g., as denoted in FIG. 8 by the line marked "N9" originating and terminating at UPF/PGW-U 835). Similarly, UPF/PGW-U 835 may receive traffic from UE 103 (e.g., via RAN 810, SMF/PGW-C 820, and/or one or more other devices), and may forward the traffic toward DN 855. In some embodiments, UPF/PGW-U 835 may communicate (e.g., via the N4 interface) with SMF/PGW-C 820, regarding user plane data processed by UPF/PGW-U 835.

UDM/HSS 840 and AUSF 845 may include one or more devices, systems, VNFs, CNFs, etc., that manage, update, and/or store, in one or more memory devices associated with AUSF 845 and/or UDM/HSS 840, profile information associated with a subscriber. AUSF 845 and/or UDM/HSS 840 may perform authentication, authorization, and/or accounting operations associated with the subscriber and/or a communication session with UE 103.

NSACF 105 may include one or more devices, systems, VNFs, CNFs, etc., that perform some or all of the operations described above. Additionally, or alternatively, NSACF 105 may communicate with SMF 820 in order to track a quantity of PDU sessions associated with a given network slice, and to indicate to SMF 820 whether additional PDU sessions should be allowed to be established or should be rejected (e.g., based on one or more thresholds of maximum PDU sessions per network slice).

NEF 850 may serve as an interface between one or more of the elements of environment 800 (e.g., core network functions) and one or more devices or systems that are external to the core network. For example, NEF 850 may communicate with AF 101 via DN 855 in order to perform some or all of the operations described above.

DN 855 may include one or more wired and/or wireless networks. For example, DN 855 may include an IP-based PDN, a wide area network ("WAN") such as the Internet, a private enterprise network, and/or one or more other networks. UE 103 may communicate, through DN 855, with data servers, other UEs 103, and/or to other servers or applications that are coupled to DN 855. DN 855 may be connected to one or more other networks, such as a public switched telephone network ("PSTN"), a public land mobile network ("PLMN"), and/or another network. DN 855 may be connected to one or more devices, such as content providers, applications, web servers, and/or other devices, with which UE 103 may communicate.

Figure 9:
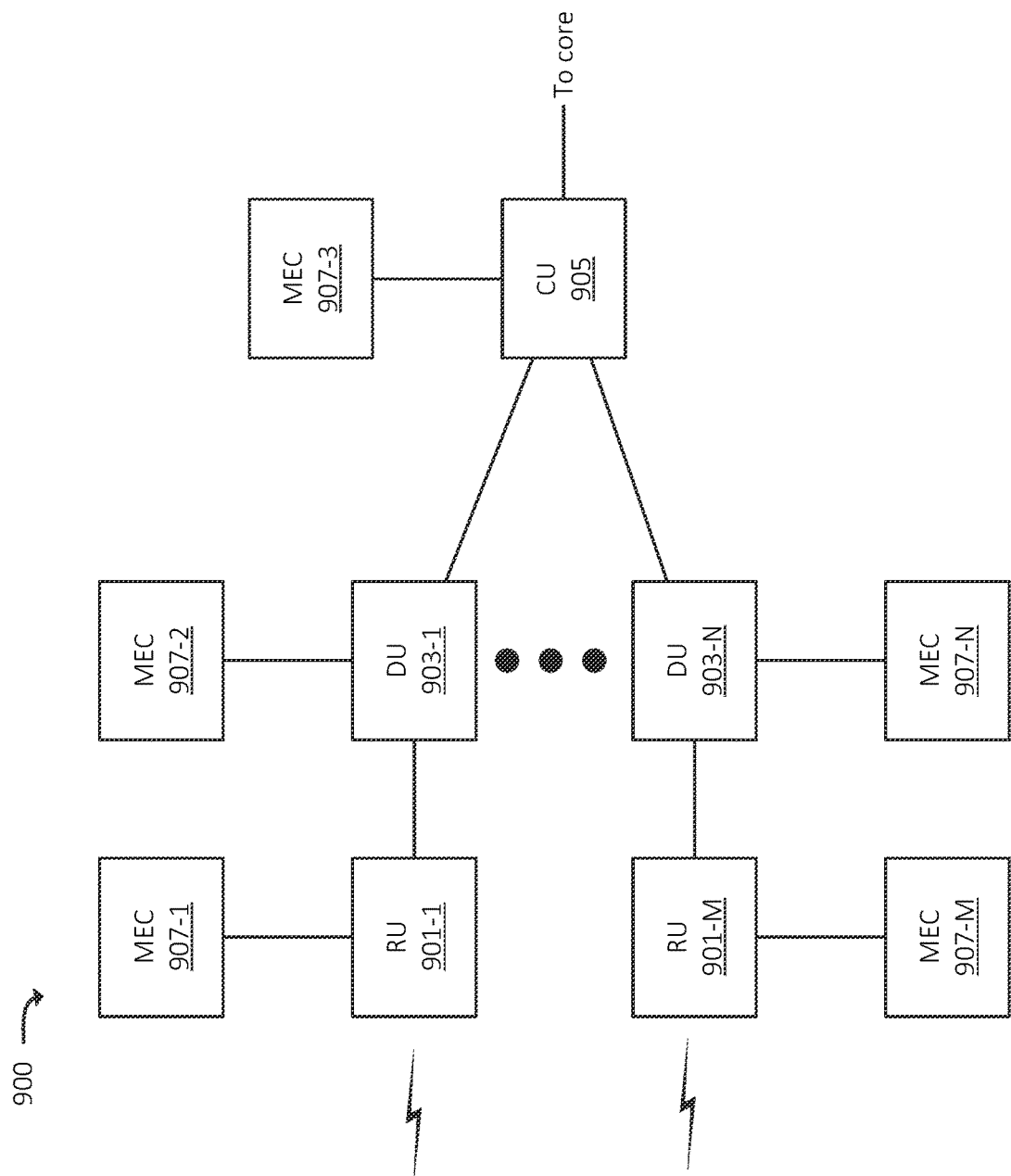
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 810, RAN 812, or some other RAN). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 107 and/or UPF/PGW-U 835). In the uplink direction (e.g., for traffic from UEs 103 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 103, and may determine which DU(s) 903 should receive the downlink traffic. DU 903 may include one or more devices that transmit traffic between a core network (e.g., via CU 905) and UE 103 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 103.

RU 901 may include hardware circuitry (e.g., one or more RF transceivers, antennas, radios, and/or other suitable hardware) to communicate wirelessly (e.g., via an RF interface) with one or more UEs 103, one or more other DUs 903 (e.g., via RUs 901 associated with DUs 903), and/or any other suitable type of device. In the uplink direction, RU 901 may receive traffic from UE 103 and/or another DU 903 via the RF interface and may provide the traffic to DU 903. In the downlink direction, RU 901 may receive traffic from DU 903, and may provide the traffic to UE 103 and/or another DU 903.

RUs 901 may, in some embodiments, be communicatively coupled to one or more Multi-Access/Mobile Edge Computing ("MEC") devices, referred to sometimes herein simply as "MECs" 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 103, via a respective RU 901.

For example, RU 901-1 may route some traffic, from UE 103, to MEC 907-1 instead of to a core network (e.g., via DU 903 and CU 905). MEC 907-1 may process the traffic, perform one or more computations based on the received traffic, and may provide traffic to UE 103 via RU 901-1. In this manner, ultra-low latency services may be provided to UE 103, as traffic does not need to traverse DU 903, CU 905, and an intervening backhaul network between DU network 900 and the core network. In some embodiments, MEC 907 may include, and/or may implement, some or all of the functionality described above with respect to AF 101, UPF 835, and/or one or more other devices, systems, VNFs, CNFs, etc.

Figure 10:
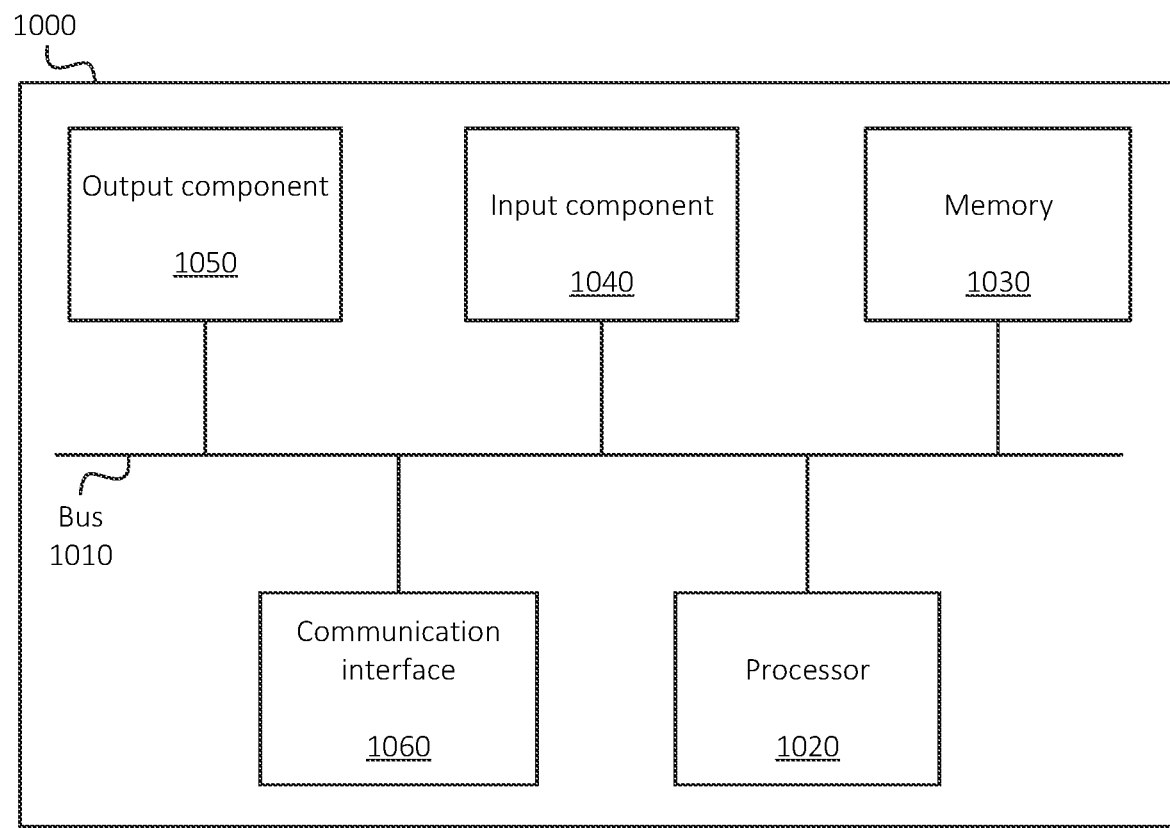
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive information associating a particular application function ("AF") and a first User Equipment ("UE") with a first set of admission control options;
receive information associating the particular AF and a second UE with a second set of admission control options;
receive a request to establish a first communication session, via a core network, between the particular AF and the first UE;
select, based on the information associating the particular AF and the first UE with the first set of admission control options, the first set of admission control options for the requested first communication session between the particular AF and the first UE;
receive, from the first UE, a selection of a first admission control option of the first set of admission control options;
identify one or more actions associated with the first admission control option, wherein the one or more actions include at least one of:

rejecting the request to establish the first communication session, or accepting the request to establish the first communication session;

perform the one or more identified actions associated with the first admission control option;

receive a second request to establish a second communication session between the particular AF and the second UE;

select, based on the information associating the particular AF and the second UE with the second set of admission control options, the second set of admission control options for the requested second communication session between the particular AF and the second UE; and perform a particular action, associated with the second admission control option, with respect to the requested second communication session between the particular AF and the second UE.

2. The device of claim 1, wherein the one or more processors are further configured to:

notify the particular AF of the first admission control option with which the first communication session is associated; and notify the particular AF of the second admission control option with which the second communication session is associated.

3. The device of claim 1, wherein the one or more processors are further configured to:

maintain information associating a plurality of different sets of admission control criteria to a plurality of different sets of admission control options, wherein determining that the requested first communication session is associated with the first set of admission control options includes comparing attributes of the request to the maintained plurality of sets of admission control criteria.

4. The device of claim 3, wherein the plurality of sets of admission control criteria include a particular set of admission control criteria, wherein the particular set of admission control criteria includes an identifier of a particular network slice of the core network, wherein the particular set of admission control criteria is associated with the first set of admission control options, wherein determining that the requested first communication session is associated with the first set of admission control options includes determining that the request to establish the first communication session includes the identifier of the particular network slice.

5. The device of claim 1, wherein the one or more devices include an Access and Mobility Management Function ("AMF") associated with the core network.

6. The device of claim 5, wherein the AMF is communicatively coupled to a Network Slice Access Control Function ("NSACF") of the core network.

7. The device of claim 6, wherein the NSACF provides an indication to the AMF of the first set of admission control options based on attributes of the request to establish the first communication session.

8. A non-transitory computer-readable medium, storing a plurality of processor-executable instructions to:

receive information associating a particular application function ("AF") and a first User Equipment ("UE") with a first set of admission control options;

receive information associating the particular AF and a second UE with a second set of admission control options;

receive a request to establish a first communication session, via a core network, between the particular AF and the first UE;

select, based on the information associating the particular AF and the first UE with the first set of admission control options, the first set of admission control options for that the requested first communication session between the particular AF and the first UE;

receive, from the first UE, a selection of a first admission control option of the first set of admission control options;

identify one or more actions associated with the first admission control option, wherein the one or more actions include at least one of:

rejecting the request to establish the first communication session, or accepting the request to establish the first communication session;

perform the one or more identified actions associated with the first admission control option;

receive a second request to establish a second communication session between the particular AF and the second UE;

select, based on the information associating the particular AF and the second UE with the second set of admission control options, the second set of admission control options for the requested second communication session between the particular AF and the second UE; and perform a particular action, associated with the second admission control option, with respect to the requested second communication session between the particular AF and the second UE.

9. The non-transitory computer-readable medium of claim 8, wherein the plurality of processor-executable instructions further include processor-executable instructions to:

notify the particular AF of the first admission control option with which the first communication session is associated; and notify the particular AF of the second admission control option with which the second communication session is associated.

10. The non-transitory computer-readable medium of claim 8, wherein the plurality of processor-executable instructions further include processor-executable instructions to:

maintain information associating a plurality of different sets of admission control criteria to a plurality of different sets of admission control options, wherein determining that the requested first communication session is associated with the first set of admission control options includes comparing attributes of the request to the maintained plurality of sets of admission control criteria.

11. The non-transitory computer-readable medium of claim 10, wherein the plurality of sets of admission control criteria include a particular set of admission control criteria, wherein the particular set of admission control criteria includes an identifier of a particular network slice of the core network, wherein the particular set of admission control criteria is associated with the first set of admission control options, wherein determining that the requested first communication session is associated with the first set of admission control options includes determining that the request to establish the first communication session includes the identifier of the particular network slice.

12. The non-transitory computer-readable medium of claim 8, wherein the one or more actions are performed by an Access and Mobility Management Function ("AMF") associated with the core network.

13. The non-transitory computer-readable medium of claim 12, wherein the AMF is communicatively coupled to a Network Slice Access Control Function ("NSACF") of the core network.

14. The non-transitory computer-readable medium of claim 13, wherein the NSACF provides an indication to the AMF of the first set of admission control options based on attributes of the request to establish the first communication session.

15. A method, comprising:
  receiving information associating a particular application function ("AF") and a first User Equipment ("UE") with a first set of admission control options;
  receiving information associating the particular AF and a second UE with a second set of admission control options;
  receiving a request to establish a first communication session, via a core network, between the particular AF and the first UE;
  selecting, based on the information associating the particular AF and the first UE with the first set of admission control options, the first set of admission control options for the requested first communication session between the particular AF and the first UE;
  receiving, from the first UE, a selection of a first admission control option of the first set of admission control options;
  identifying one or more actions associated with the first admission control option, wherein the one or more actions include at least one of:
    rejecting the request to establish the first communication session, or
    accepting the request to establish the first communication session;
  performing the one or more identified actions associated with the first admission control option;
  receiving a second request to establish a second communication session between the particular AF and the second UE;
  selecting, based on the information associating the particular AF and the second UE with the second set of admission control options, the second set of admission control options for the requested second communication session between the particular AF and the second UE; and
  performing a particular action, associated with the second admission control option, with respect to the requested second communication session between the particular AF and the second UE.

16. The method of claim 15, further comprising:
  notifying the particular AF of the first admission control option with which the first communication session is associated; and
  notifying the particular AF of the second admission control option with which the second communication session is associated.

17. The method of claim 15, further comprising:
  maintaining information associating a plurality of different sets of admission control criteria to a plurality of different sets of admission control options,
  wherein determining that the requested first communication session is associated with the first set of admission control options includes comparing attributes of the request to the maintained plurality of sets of admission control criteria.

18. The method of claim 17,
  wherein the plurality of sets of admission control criteria include a particular set of admission control criteria,
    wherein the particular set of admission control criteria includes an identifier of a particular network slice of the core network,
    wherein the particular set of admission control criteria is associated with the first set of admission control options,
  wherein determining that the requested first communication session is associated with the first set of admission control options includes determining that the request to establish the first communication session includes the identifier of the particular network slice.

19. The method of claim 15, wherein the one or more identified actions are performed by an Access and Mobility Management Function ("AMF") associated with the core network.

20. The method of claim 19, wherein the AMF is communicatively coupled to a Network Slice Access Control Function ("NSACF") of the core network, wherein the NSACF provides an indication to the AMF of the first set of admission control options based on attributes of the request to establish the first communication session.

* * * * *